(12) United States Patent
Guillot

(10) Patent No.: US 7,011,297 B1
(45) Date of Patent: Mar. 14, 2006

(54) HAND RAIL ASSEMBLY FOR RECREATIONAL VEHICLES

(75) Inventor: Edmond P. Guillot, Conover, NC (US)

(73) Assignee: Hickory Springs Manufacturing Company, Hickory, NC (US)

( * ) Notice: Subject to any disclaimer, the term of this patent is extended or adjusted under 35 U.S.C. 154(b) by 309 days.

(21) Appl. No.: 10/322,040

(22) Filed: Dec. 17, 2002

(51) Int. Cl.
*E04H 17/14* (2006.01)

(52) U.S. Cl. ....................................................... 256/67
(58) Field of Classification Search .................. 296/23; 256/24, 25, 59, 65.01, 65.02, 65.03, 67
See application file for complete search history.

(56) References Cited

U.S. PATENT DOCUMENTS

| | | | | |
|---|---|---|---|---|
| 4,029,352 A | * | 6/1977 | Evans | 296/156 |
| 4,261,550 A | * | 4/1981 | Gregory | 256/67 |
| 4,494,793 A | | 1/1985 | Rogers, Jr. | 297/85 |
| 4,932,090 A | | 6/1990 | Johansson | 5/445 |
| 4,976,455 A | | 12/1990 | Brammer, Sr. et al. | 280/762 |
| 5,024,420 A | * | 6/1991 | Downing | 256/67 |
| 5,025,352 A | | 6/1991 | Brown | 362/83.3 |
| 5,116,025 A | | 5/1992 | Kiniry | 256/67 |
| 5,280,934 A | | 1/1994 | Monte | 280/166 |
| 5,297,010 A | | 3/1994 | Camarota et al. | 362/80 |
| 5,581,230 A | | 12/1996 | Barrett | 340/332 |
| 5,662,556 A | | 9/1997 | Gangloff | 482/38 |
| 5,816,374 A | | 10/1998 | Hsien | 190/115 |
| 5,924,228 A | | 7/1999 | Yang | 40/610 |
| 6,070,998 A | | 6/2000 | Jennings et al. | 362/501 |
| 6,135,487 A | | 10/2000 | Flannery et al. | 280/642 |
| 6,164,805 A | | 12/2000 | Hulse | 362/501 |
| 6,336,414 B1 | | 1/2002 | Stewart et al. | 108/50.02 |
| 6,347,880 B1 | | 2/2002 | Furst et al. | 362/494 |
| 2001/0006465 A1 | | 7/2001 | Misawa et al. | 362/501 |
| 2002/0030988 A1 | | 3/2002 | Stupf | 362/85 |
| 2002/0075683 A1 | * | 6/2002 | Striebel et al. | 362/267 |

* cited by examiner

*Primary Examiner*—John R. Cottingham
(74) *Attorney, Agent, or Firm*—Kennedy Covington Lobdell & Hickman, LLP

(57) ABSTRACT

A hand rail assembly for assisting the ingress and egress of a recreational vehicle. The hand rail assembly has a banister and a support structure, one end of each pivotally attached to the exterior of a recreational vehicle adjacent to a door, and the other end of each pivotally connected to each other. The hand rail assembly may be retracted to a storage position and extended in an operating position. A release mechanism coupled to the support structure provides for movement of the hand rail assembly between the storage and operating positions. The release mechanism is controlled by a trigger member to allow for one-handed movement of the hand rail assembly between the storage and operating positions while keeping the operator's hand away from pinch points, thus eliminating chances of injury. A LED lighting system integral to the banister provides illumination of the banister and surrounding area for additional safety.

12 Claims, 6 Drawing Sheets

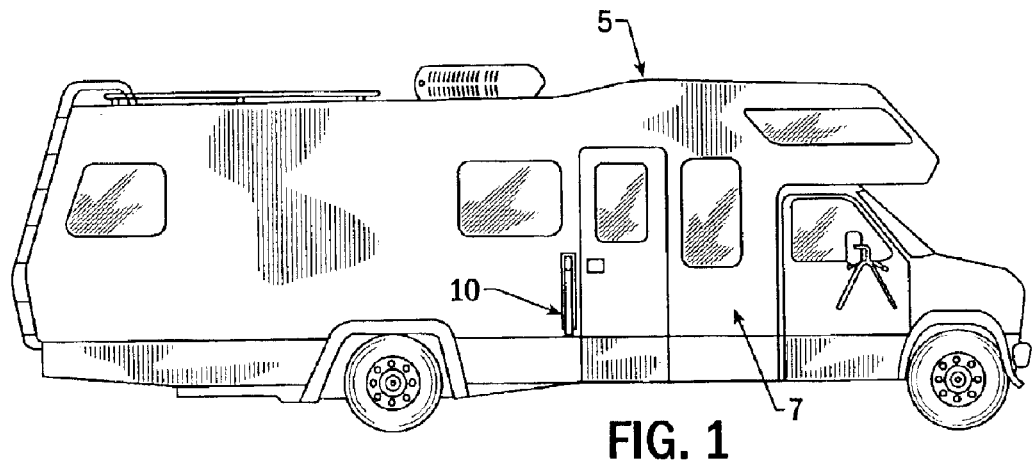
FIG. 1
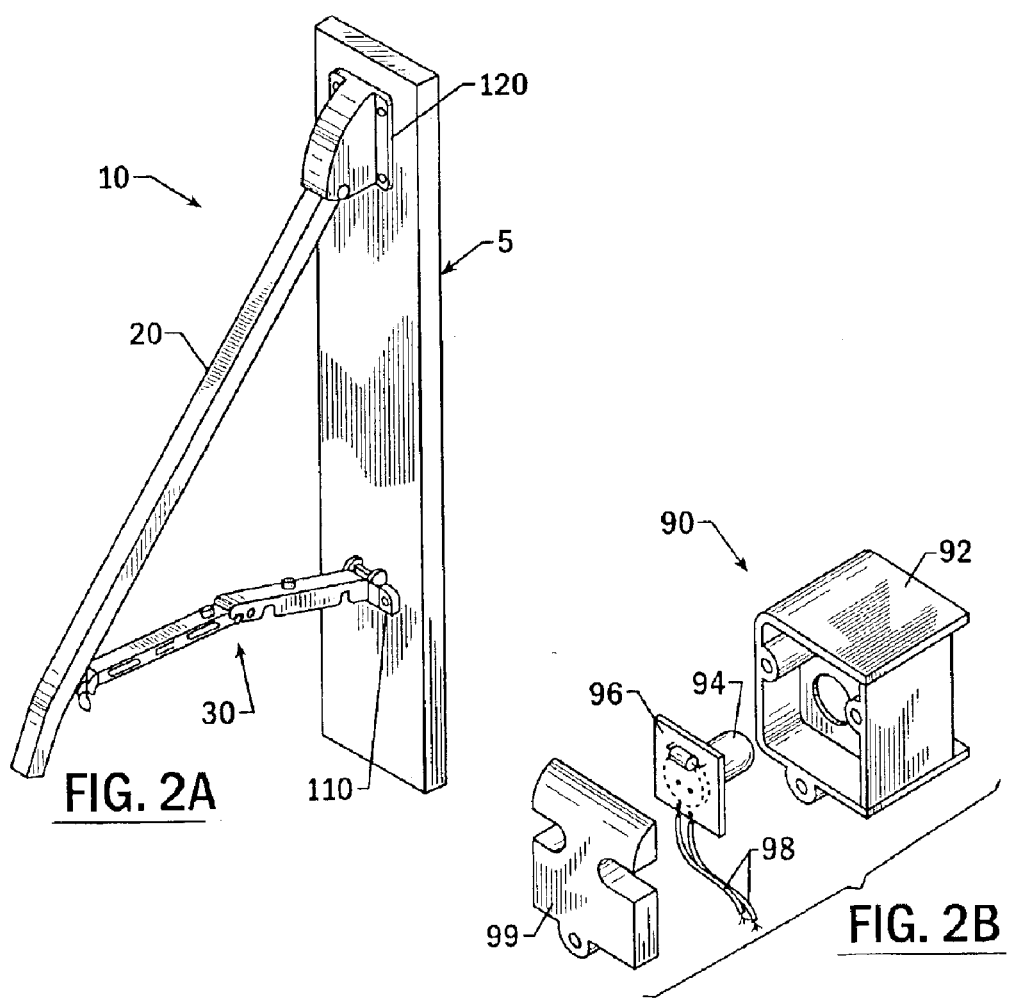
FIG. 2A
FIG. 2B

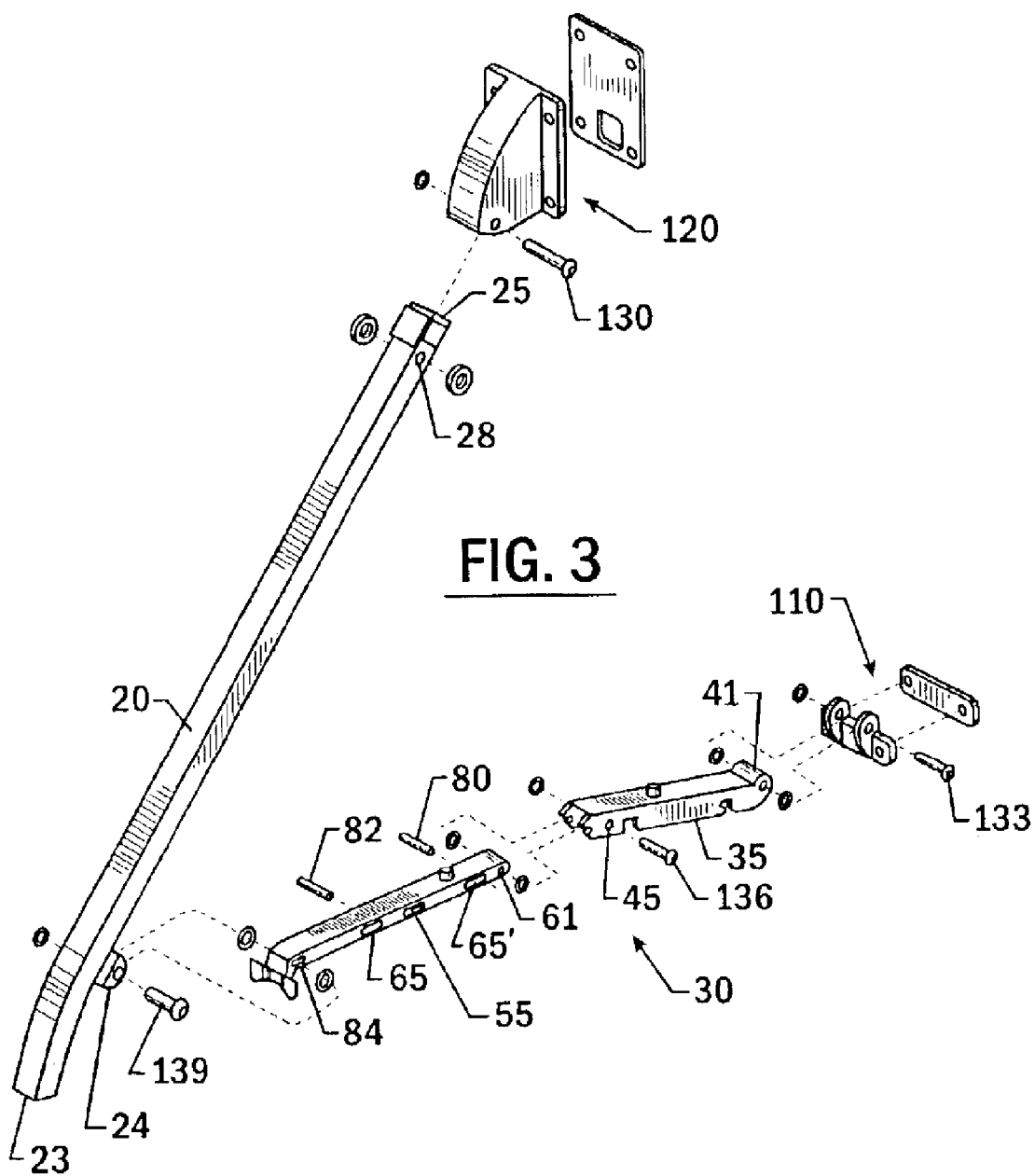

HAND RAIL ASSEMBLY FOR RECREATIONAL VEHICLES

FIELD OF INVENTION

The present invention relates to hand rails for recreational vehicles, trailers, campers and other structures for assisting in the ingress and egress of the structure, specifically hand rails that can be moved between a retracted storage position wherein the hand rail rests against the structure and an extended operating position wherein the hand rail extends outwardly from the structure.

BACKGROUND

Recreational vehicles, both towed and self-contained, travel about the country and a typically parked in campgrounds. When parked and occupied, ingress and egress of the recreational vehicle is generally through a door in the side of the vehicle. Stairs at the door are usually required because of the terrain on which the vehicle is parked and the height of the vehicle floor from the ground. Although stairs are usually provided with the recreational vehicle, hand rails are not, and those provided are often times a vertical handle attached to the exterior of the recreational vehicle. Such a vertical handle does not generally extend sufficiently far from the side of the recreational vehicle to provide assistance to a person using the stairs. Thus, a need exists for providing a hand rail assembly that extends the length of the stairs for use therewith. Such a hand rail assembly may be separate from the vehicle—requiring construction placement adjacent to the door of the vehicle before it can be used—or affixed to the exterior of the recreational vehicle.

An additional consideration regarding the use of a hand rail assembly affixed to a recreational vehicle is that the recreational vehicle must conform to the width requirements for vehicles traveling on highways. Many times, the recreational vehicles are near the width limit such that any equipment on the exterior of the vehicle must not protrude very far from the vehicle. Therefore, any hand rail assembly affixed to the recreational vehicle must be retractable from the extended position so that the hand rail assembly can be stored against the recreational vehicle during travel. Thus, a need exists for providing a hand rail assembly that is affixed to the recreational vehicle and that can be moved between a storage position, retracted against the exterior of the vehicle, and an operating position, extending from the vehicle.

Folding hand rails have been previously disclosed. For example, U.S. Pat. No. 4,261,550 discloses a handrail structure mountable to the exterior of a trailer home. One end of the handrail is pivotally connected to the trailer and the opposite end of the handrail is free. A brace pivotally connected to the trailer fits into a channel integral to the handrail. The brace slides within the channel for movement of the free end of the handrail between a retracted position and an extended position. The brace is lockable within the slide by a wing screw to keep the handrail in the desired position. To position the handrail, the handrail must be held in position while the wing-screw is loosened. Then, the handrail is moved to a second position and again held, manually, in the desired position while the wing-screw is tightened. Thus, to operate the hand rail requires the use of both hands and/or two people and the persons' fingers are placed in danger of being caught within "pinch-points" of the handrail structure.

Other foldable hand rails have been suggested, for example U.S. Pat. Nos. 4,029,352 and 5,024,420, that disclose different types of adjustable braces for supporting the handrail in an extending position. These inventions also require manual manipulation of a locking system to place and lock the adjustable braces in the desired position. Such manipulation may not be easily performed by one person and, again, creates "pinchpoints" with which persons manipulating the hand rail assemblies may be injured.

Another foldable hand rail invention is disclosed by U.S. Pat. No. 5,280,934, which attaches a lower end of an expandable hand rail to foldable stairs. The hand rail expands as the stairs are extended and retracts when the stairs are retracted. The disadvantage of such an invention is that the angle of the hand rail may be too slight or too steep to be of use, especially for people with limited mobility. Further, the hand rail is dependent on the operation of stairs attached to the recreational vehicle. If the recreational vehicle does not include foldable stairs, or if the stairs are inoperable, then the hand rail cannot be expanded.

Another disadvantage of the inventions discussed above is that none of the previous hand rails are self-illuminated whenever the hand rail structure is extended to provide illumination of the hand rail and surrounding area, including the stairs and door, at times of reduced visibility. Thus, an external light source is required to safely traverse the stairs, either attachable to the recreational vehicle or hand held, which presents additional problems. Further, any external light source must be manually activated, which may not be possible if the actuator for the external light source is located inside the recreational vehicle and a person is trying to use the stairs and hand rail external to the recreational vehicle.

Thus, it is desirable to have a hand rail assembly that is retractable for placing into a storage position and extendible into an operating position and that overcomes the above discussed disadvantages.

SUMMARY OF THE INVENTION

A hand rail assembly of the present invention comprise a banister and a support assembly. One end of the banister is connected to the exterior of a recreational vehicle, adjacent to a door, in such a manner as to allow the banister to pivot about the connection. One end of the support assembly is similarly attached to the recreational vehicle exterior. The free end of the banister is pivotally connected to the free end of the support assembly. In this manner, the hand rail assembly is moveable between a retracted storage position—with the banister and support assembly located adjacent to the exterior of the recreational vehicle by the door—and an extended operating position—with the banister and support assembly extending outwardly from the recreational vehicle. A release mechanism allows the hand rail assembly to move between the storage position and the operating position.

In a preferred embodiment, the release mechanism is coupled to the support structure and actuated by a trigger-style-member. The release mechanism provides for one-handed latching and unlatching of the hand rail in which the hand is kept away from pinch points at the hinged locations and between the support assembly and the banister, thus eliminating the danger of injury during movement of the hand rail assembly.

In a preferred embodiment, the banister of the hand rail is transparent. A lighting system comprising of a liquid emitting diode (LED) is coupled with the transparent banister to provide illumination of the banister and surrounding area, including the stairs and door, when the hand rail assembly is in the extended, operating position. In one embodiment, the LED lighting system is placed inside a portion of the banister. In an alternative embodiment, the LED lighting system is affixed to the banister. The LED lighting system is actuated by moving the hand rail assembly to the operating position. When the lighting system is actuated, the recreational vehicle occupants can easily find the banister and, subsequently the stairs and door, at night time or other times of limited external lighting.

The hand rail assembly of the present invention may be used in either the storage position—assisting in the ingress or egress of the recreational vehicle before the hand rail assembly has been deployed—or the operating position—when the hand rail assembly is extended.

BRIEF DESCRIPTION OF THE DRAWINGS

Further features, embodiments, and advantages of the present invention will become apparent from the following detailed description with reference to the drawings, wherein:

FIG. 1 illustrates the hand rail of the present invention located on a recreational vehicle;

FIG. 2A is a perspective view illustrating the lighted hand rail of the present invention as attached to an exterior of a recreational vehicle;

FIG. 2B is an exploded view showing a lighting system insertable in the hand rail of the present invention;

FIG. 3 is an exploded view of the mechanical devices comprising the hand rail of the present invention;

DETAILED DESCRIPTION OF THE PREFERRED EMBODIMENT

Figure 4:
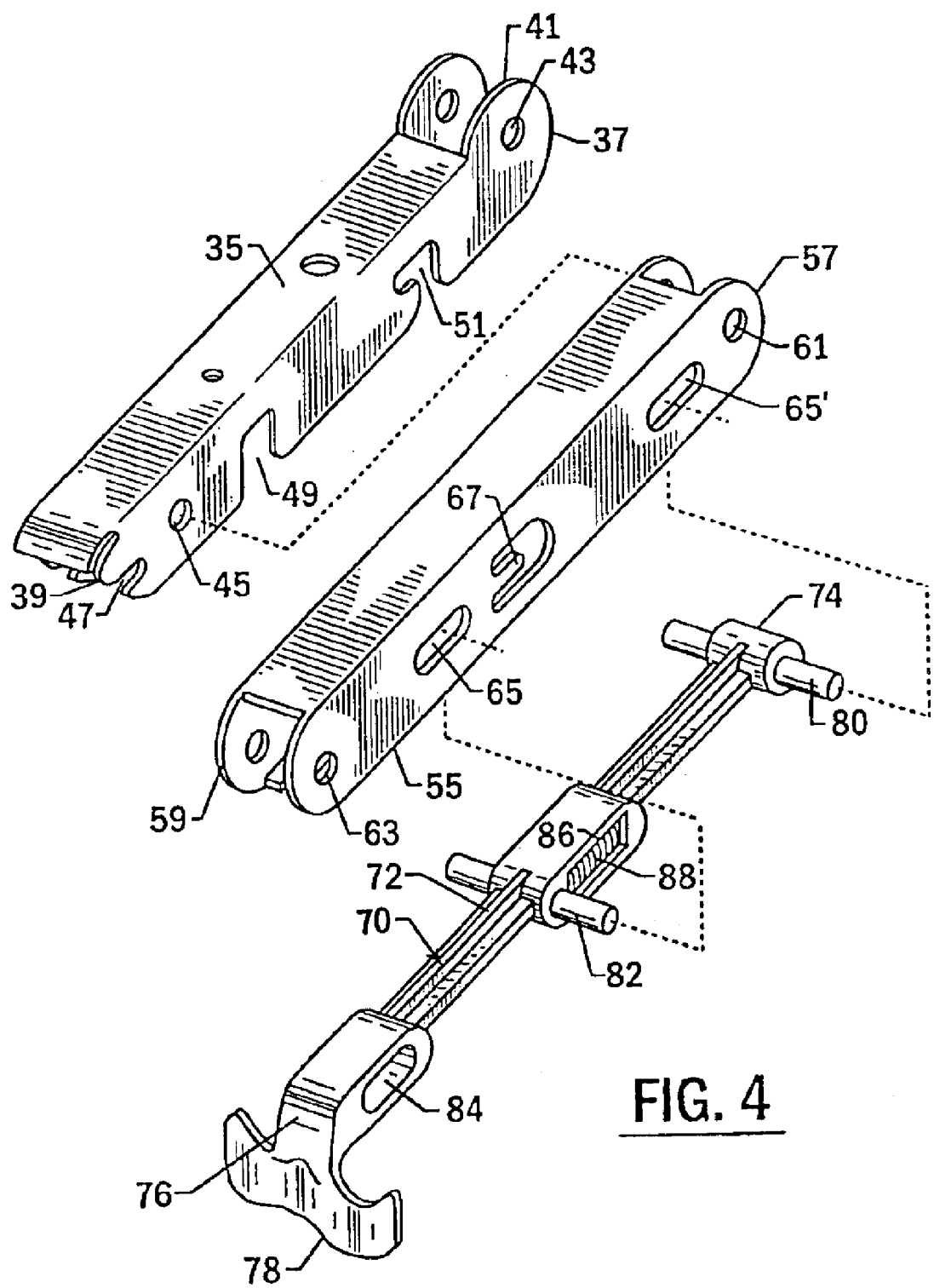
FIG. 4 is an exploded view illustrating the components of the support assembly of the hand rail.
Figure 5:
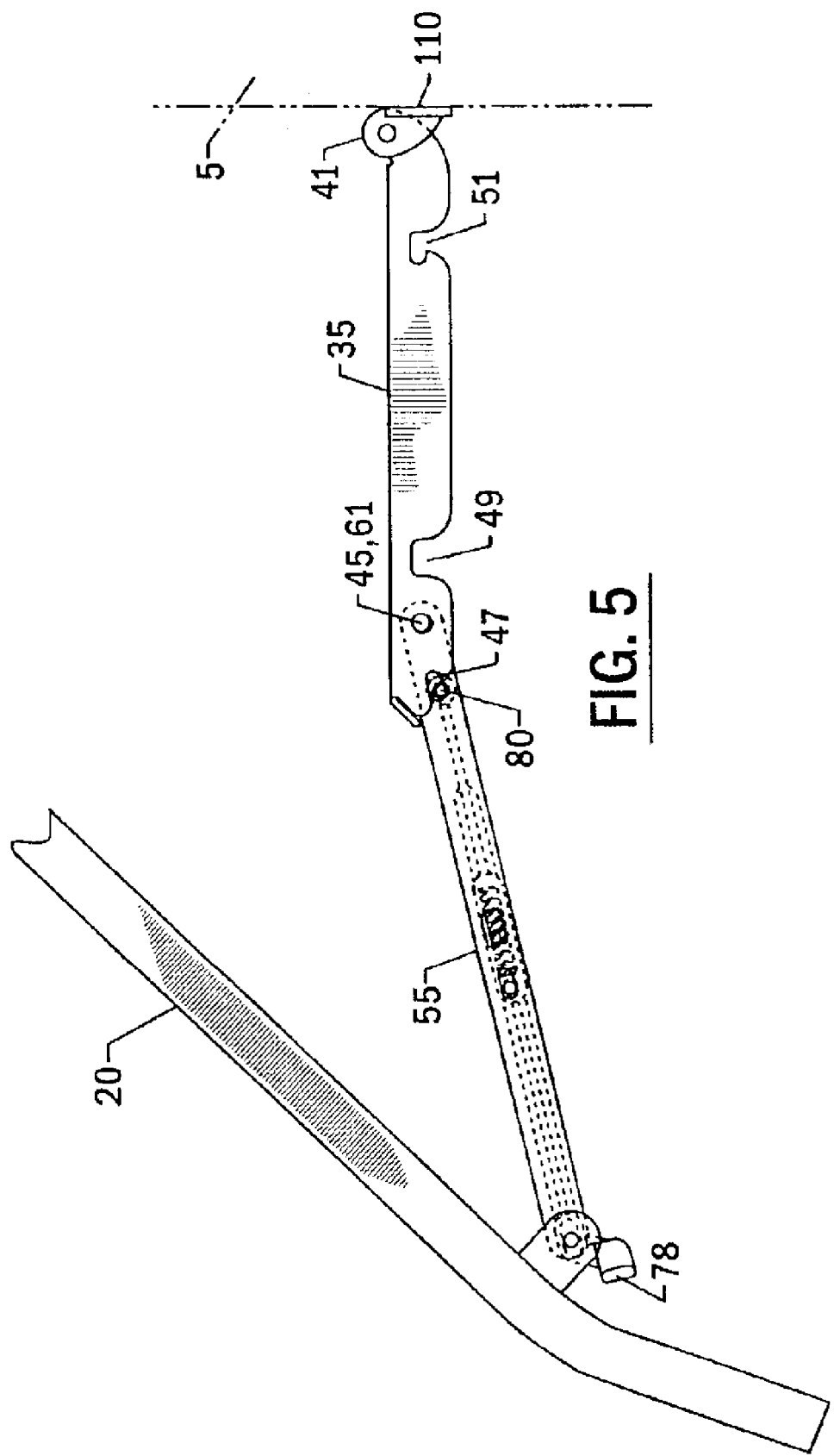
FIG. 5 is a side elevation view of the hand rail of the present invention, showing the hand rail in the operating position.
Figure 6:
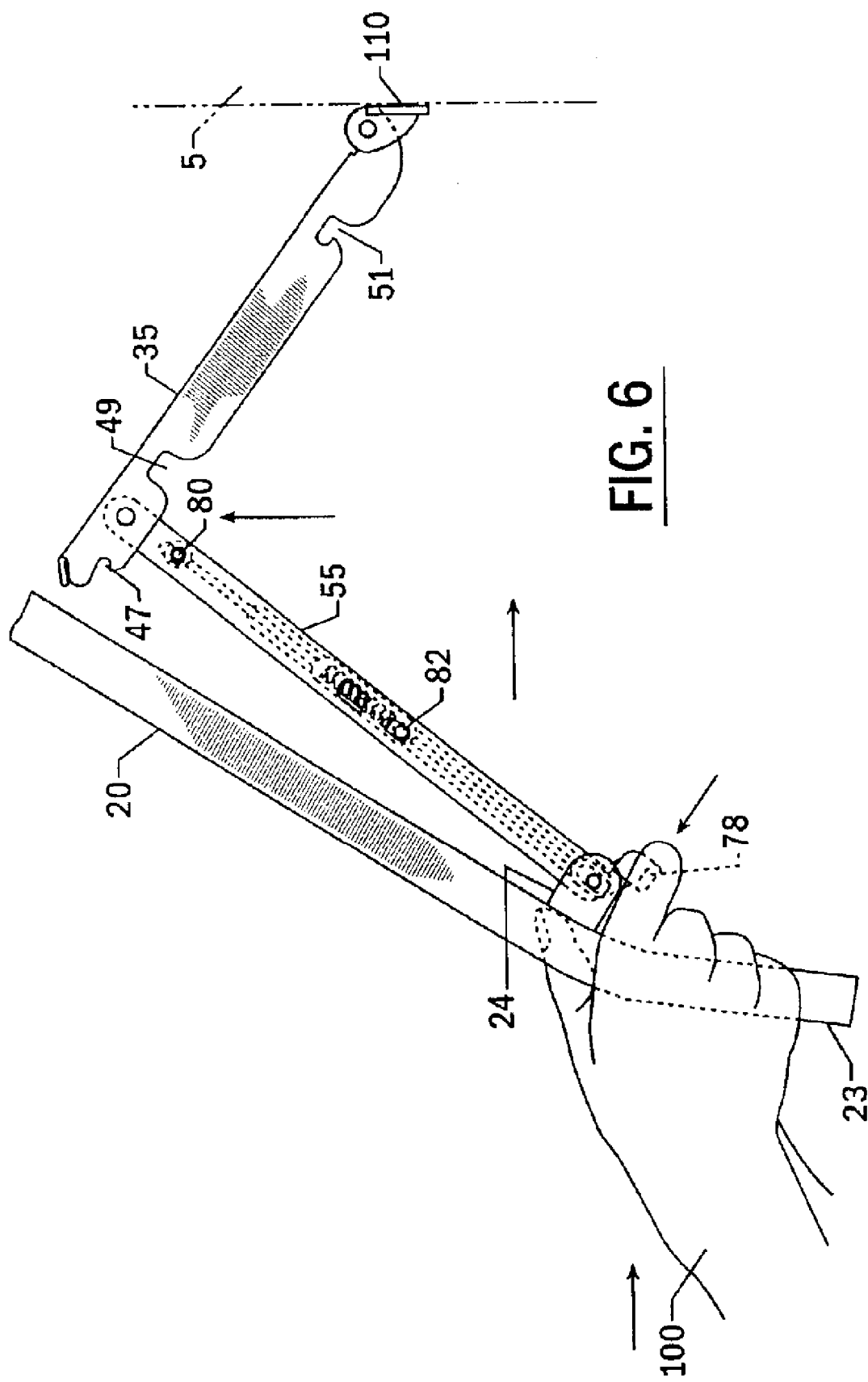
FIG. 6 is a side elevation view of the hand rail, illustrating the hand rail as an operator prepares to move the hand rail of the present invention from an extended, operating position to a retracted, storage position.
Figure 7:
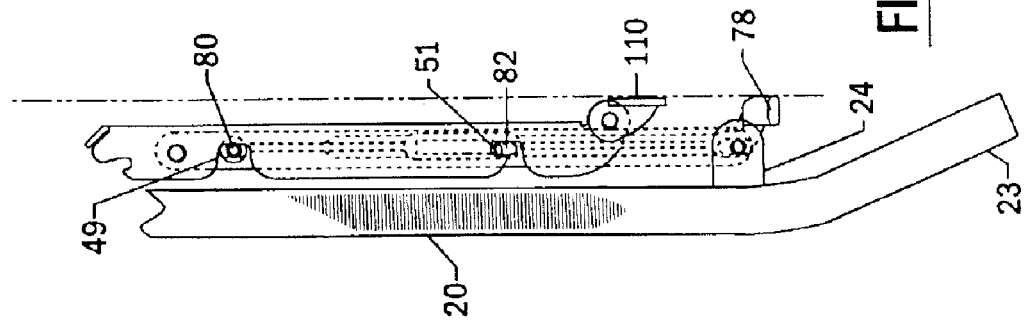
FIG. 7 is a side elevation view of the hand rail of the present invention, illustrating the hand rail in an intermediate position during movement between the operating position and the storage position.

In the following description, and for purposes of this invention, the terms "upper", "lower", "inner" and "outer" are used to differentiate between components and in no way limits or otherwise restricts the relative positions of the components. Referring now to FIGS. 1 and 2, a hand rail assembly 10 attaches to an exterior of a recreational vehicle 5 adjacent to an opening 7 for egress and ingress, for example a door, by lower mounting bracket 110 and upper mounting assembly 120. The hand rail assembly 10 comprises a banister 20, attached at one end to the upper mounting assembly 120, and a support assembly 30 attached at one end to the lower mounting bracket 110. A free end of the banister 20 is attached to a free end of the support assembly 30. The support assembly 30 is collapsible for movement of the hand rail assembly 10 between a retracted storage position and an extended operating position (as illustrated in FIGS. 5–8).

As shown in FIG. 3A, the banister 20 comprises a structural material having a generally rectangular cross section. The banister 20 has an upper end 25 and a lower end 23. A yoke 24 is affixed to a bottom surface of the banister 20 near the lower end 23 for pivotal attachment to the support assembly 30. An opening 28 extending between opposing sides of the banister 20 near the upper end 25 is used to attach the upper end 25 of the banister 20 to the upper mounting assembly 120. Preferably, the structural material of the banister 20 is transparent. More preferably, the structural material of the banister 20 is acrylic.

The support assembly 30 has an outer arm 35 and an inner arm 55 pivotally attached to the outer arm 35. As shown in FIG. 4, the outer arm 35 comprises a trough having a surface and opposing sides. The trough has an upper end 37 and a lower end 39. Attachment ears 41 extend beyond the surface of the trough and are aligned with the opposing sides of the trough at the upper end 37 of the trough. Holes 43 within the attachment ears 41 provide pivotal attachment of the outer arm 35 to the lower mounting bracket 110. Lower connection holes 45, formed in opposing sides of the trough near the lower end 39 are used to pivotally connect the outer arm 35 to the inner arm 55. A first set of cutouts 47 formed in opposing sides of the trough at the lower end 39 of the outer arm 35 provide a first locking position. A second set of cutouts 51 formed in opposing sides of the trough of the outer arm 35 near the upper end 37 provide a second locking position. Indentations 49 are cut in opposing sides of the trough intermediate the lower attachment holes 45 and the second set of cutouts 51.

As shown in FIG. 4, the inner arm 55 comprises a 'C' shaped channel with two opposing sides, an upper end 57 and a lower end 59. The inner arm 55 is of a size to be nestable within the trough of the outer arm 35 when the hand rail assembly 10 is retracted in the storage position. Upper connection holes 61 formed in the opposing sides of the channel near the upper end 57 for connecting the inner arm 55 to the outer arm 35. Lower connection holes 63 formed in the opposing sides of the channel near the lower end 59 are used to connect the inner arm 55 to the banister 20. At least one set of aligned slots 65 are formed in the opposing sides of the channel. As illustrated in FIG. 4, a preferred embodiment of the invention includes two sets of aligned slots 65, 65' formed in the opposing sides of the channel intermediate the upper and lower connection holes 61, 63. At least one tab 67 is created by a C-shaped cutout in one of the opposing sides of the channel intermediate the slots 65, 65'. In the preferred embodiment, two tabs are aligned on the opposing sides of the channel of the inner arm 55.

Movement of the support system 30 between the storage and operating positions is accomplished by a release mechanism 70 coupled to the support system 30. The release mechanism 70 comprises a rod 72 having a first end 74 and a second end 76. The first end 74 of the rod 72 is insertable into the channel of the inner arm 55. The rod 72 is of sufficient length such that when fully inserted into the inner arm 55, the second end 76 of the rod 72 extends beyond the lower end 59 of the inner arm 55 to form an actuating member 78. A first set of drive pins 80 is affixable to opposing sides of the rod 72 at the first end 74. In a preferred embodiment, a second set of drive pins 82 is affixable to opposing sides of the rod intermediate the first set of drive pins 80 and the second end 76 of the rod 72, the second set of drive pins 82 being aligned with the first set of drive pins 80. Opening 84 extends through opposing sides of the rod 72 near the second end 76 for slidable attachment of the release mechanism 70 to the inner arm 55 and the banister 20. At least one cavity 86 is formed in a side of the rod 72 intermediate the first and second set of drive pins 80, 82.

Preferably, two cavities 86, 86' are formed on opposing sides of the rod 72. The cavities 86, 86' are of sufficient size to accommodate recovery elements 88 disposed therein. The recovery elements 88 are used to return the release mechanism 70 to its initial position after being actuated. The recovery elements 88 may be comprises of springs, compressible elements, elastic material or other flexible, resilient material.

The assembly of the support assembly 30 is accomplished by the following. Recovery elements 88 are inserted into the cavities 86, 86' of the rod 72. The rod 72 is then inserted into the inner arm 55 such that the first end 74 of the rod 72 is near the upper end 57 of the inner arm 55. The actuating member 78 of the release mechanism 70 protrudes from the lower end 59 of the inner arm 55. The rod 72 is aligned with the slots 65, 65' formed in the opposing sides of the inner arm 55 and the first and second sets of drive pins 80, 82 are inserted through the slots of the inner arm and affixed to the rod 72. One end of each of the recovery elements 88 is affixed to the tabs 67, 67' formed in the opposing sides of the inner arm 55. Finally, the lower attachment holes 45 of the outer arm 35 are aligned with the upper attachment holes 61 of the inner arm 55. A fastener 136 is inserted through the attachment holes 45, 61, pivotally connecting the outer arm 35 to the inner arm 55. The fastener 136 comprises a rivet, a pin, a bolt, or other similar fastening component.

The opening 84 in the rod 72 of the release mechanism 70 is aligned with the lower attachment holes 63 in the lower end 59 of the inner arm 55 and with holes in the yoke 24 affixed to the banister 20. A fastener 139 is inserted-through the holes in the yoke 24, the inner arm 55 and the opening 84, pivotally connecting the inner arm 55 and the banister 20. The opening 84 of the rod 72 is shaped such that the rod 72 is pivotally connected the banister 20 along with the inner arm 55, but also is slidably connected to the inner arm 55 independent of the pivotal movement afforded thereof. The actuating member 78 of the release mechanism 70 extends from the lower end 59 of the inner arm 55 and is oriented away from the banister 20 to allow access to the actuating member 78 for movement of the hand rail assembly 10 between the storage and operating positions In a preferred embodiment, as shown in FIG. 4, the actuating member 78 of the release mechanism 70 is a trigger-style handle capable of being manipulated by one or more fingers of an operator.

In a preferred embodiment, as shown in FIG. 2B, a lighting system 90 is attached to the upper end 25 of the banister 20 for illumination of the banister 20 and surrounding area when the hand rail assembly 10 is in the operating position. The lighting system 90 comprises an end cap 92, a light emitting diode (LED) 94, a circuit board 96, and a cover 99. The end cap 92 fits over and covers the upper end 25 of the banister 20. The LED 94 is mounted on one surface of the circuit board 96. The circuit board 96 and LED 94 are inserted into the end cap 92 such that the LED 94 is oriented along a longitudinal axis of the banister 20 for illumination thereof. Wires 98 are connected to a surface of the circuit board 96 opposite the LED 94 and extend between the circuit board 96 and an electrical power source (not shown) within the recreational vehicle 5. The circuit board 96 also includes an actuating switch which operates the LED 94. The cover 99, is attached to the end cap 92 opposite the upper end 25 of the banister 20, thereby enclosing the circuit board 96 and LED 94 within the end cap 92. Electrical power from the recreational vehicle 5 flows through the wires 98 to the circuit board 96 and continues to the LED 94 when the hand rail assembly 10 is in the operating position, thus providing illumination of the banister 20 and surrounding area. The lighting system 90 is enclosed by the upper mounting assembly 120 when the upper end 25 of the banister 20 is attached to the upper mounting assembly 120, thereby protecting the lighting system 90 from impact and environmental damage.

In a preferred embodiment, the hand rail assembly 10 as disclosed above can be attached to a recreational vehicle 5 during manufacture (factory installed) or after the purchase thereof (after market installation). The upper mounting assembly 120 and the lower mounting bracket 110 are attached to the exterior of the recreational vehicle 5. The tabs 41 of the outer arm 35 of the support assembly 30 are aligned with the lower mounting bracket 110. A fastener 133 is inserted through holes in the tabs 41 and the lower mounting bracket 110, pivotally attaching the support assembly 30 to the recreational vehicle 5. The opening 28 in the upper end 25 of the banister 20 is aligned with the upper mounting assembly 120. A fastener 130 is inserted through holes in the upper mounting assembly 120 and the opening 28 of the banister 20, pivotally attaching the upper end 25 of the banister 20 to the recreational vehicle 5. Fasteners 130, 133 comprise rivets, pins, bolts, or other similar fastening components. Wires 98 from the lighting system 90 disposed between the upper end 25 of the banister 20 and the upper mounting assembly 120 are attached to an electrical power source within the recreational vehicle 5. The banister 20, inner arm 55 of the support assembly 30, and the release mechanism 70 are pivotally connected as described above. Thus, the hand rail assembly 10 is ready for use.

Figure 8:
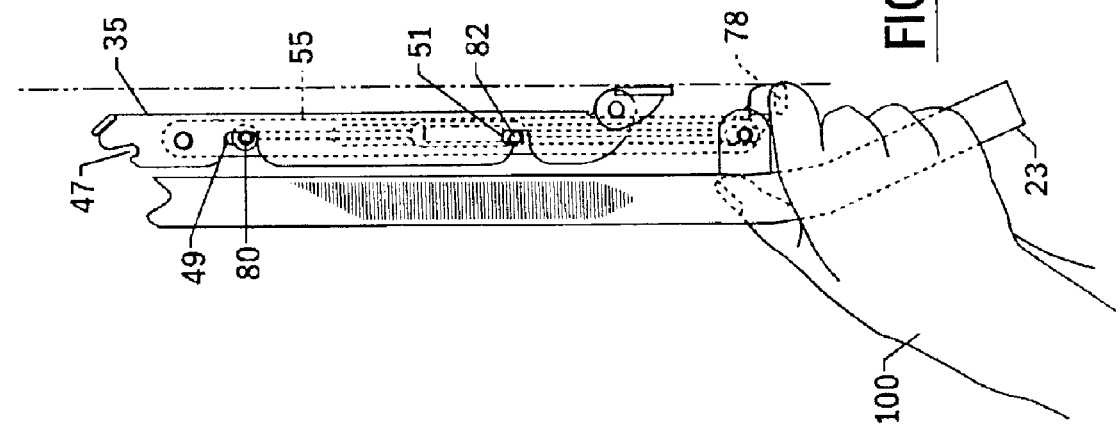
FIG. 8 is a side elevation view of the hand rail in a retracted, storage position.

The operation of the hand rail assembly 10 by a person (hereinafter referred to as "operator" 100) is disclosed below and shown in FIGS. 5–8. The hand rail assembly 10 is in the retracted, storage position against the exterior of the recreational vehicle 5 while traveling. In the storage position, as illustrated by FIG. 8, the second set of cutouts 51 in the outer arm 35 are engaged by the second set of drive pins 82 of the release mechanism 70, locking the hand rail assembly 10 in the retracted, storage, position. The first set of drive pins 80 are disposed within the indentations 49 formed in the outer arm 35. Upon stopping and preparing the recreational vehicle 5 for occupation, the operator 100, stands before in front of the door 7 of the recreational vehicle 5, facing the hand rail assembly 10 adjacent thereto. The operator 100 grasps the lower end 23 of the banister 20, where the banister 20, the support assembly 30 and the actuating member 78 of the release mechanism 70 are located. Using one finger (or more if desired), the operator 100 "squeezes" the trigger-style handle of the actuating member 78, disengaging the second set of drive pins 82 from the second set of cutouts 51 in the outer arm 35 of the support assembly 30. Upon disengagement, the hand rail assembly 10 is released for movement from the retracted storage position to the extended operating position (illustrated in FIGS. 6 and 7). When the hand rail assembly 10 reaches the operating position, the operator 100 releases the trigger-style handle of the actuating member 78, thereby engaging the first set of drive pins 80 in the first set of cutouts 47 in the outer arm 35 of the support assembly 30, thus locking the hand rail assembly 10 in the operating position (illustrated in FIG. 5). With the extension of the hand rail assembly 10 to the operating position, the LED 94 of the lighting system 90 at the upper end 25 of the banister 20 is activated, providing illumination of the banister 20 and the surrounding area. When the recreational vehicle 5 is being prepared for travel, the operator 100 "squeezes" the trigger-style handle of the actuating member 78, disengaging the first set of drive pins 80 from the first set of cutouts 47 in the outer arm 35 of the support assembly 30. The operator 100 then retracts the hand rail assembly 10 until the hand rail assembly 10 is adjacent the door 7 of the recreational vehicle 5. Once the storage position is reached, the operator 100 releases the trigger-style handle of the actuating member 78, engaging the second set of drive pins 82 in the second set of cutouts 51 in the outer arm 35 of the support assembly 30, thus locking the hand rail assembly 10 in the storage position and ready for travel. The first and second sets of drive pins 80, 82 slide within the slots 65, 65' in the inner arm 55 during engagement and disengagement, as does the rod 72 relative to the inner arm 55 and the banister 20 by the fastener 139 moving within the opening 84 of the rod 72. Because the hand rail assembly 10 securely locks in the storage position, the hand rail assembly 10 can also be used in the storage position to enter or exit the recreational vehicle 5 if desired. Throughout the movements of the hand rail assembly 10 as discussed above, the operator 100 is kept well clear of any "pinch points" of the hand rail assembly 10, thus significantly reducing the risk of being injured during movement thereof. Further, movement of the hand rail assembly 10 may be accomplished by the operator 100 without additional assistance.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A hand rail assembly to assist in the ingress and egress of a recreational vehicle, the hand rail assembly comprising:
   (1) a first mounting bracket fixedly attached to an exterior of the recreational vehicle adjacent to an ingress-egress opening in the recreational vehicle;
   (2) a second mounting bracket fixedly attached to the exterior of the recreational vehicle at a spacing from the first mounting bracket;
   (3) a banister having opposing ends, a first one of the ends pivotally attached to the first mounting bracket;
   (4) a support assembly having one end pivotally connected to the second mounting bracket and another end pivotally connected to the banister intermediate the ends thereof, wherein the support assembly comprises an outer arm and an inner arm, the outer arm being pivotally connected to the second mounting bracket, one end of the inner arm being pivotally connected to the outer arm opposite the second mounting bracket, another end of the inner arm being pivotally connected to the banister; and
   (5) a release mechanism coupled to the support assembly and having a trigger member for latching and unlatching the hand rail assembly for movement between a retracted storage position adjacent to the opening of the recreational vehicle and an extended operating position extending outwardly from the recreational vehicle, the trigger member actuating the release mechanism for movement of the hand rail assembly between the operating and storage positions, wherein the release mechanism comprises;
      (i) a rod insertable into an interior of the inner arm, one end of the rod protruding from an end of the inner arm connected to the banister to form the trigger member;
      (ii) at least one set of drive pins protruding from opposing sides of the rod, the drive pins extendible through aligned openings on opposing sides of the inner arm for engagement of aligned cutouts in opposing sides of the outer arm; and
      (iii) at least one recovery element extending between the rod and the inner arm, the recovery element being engaged by actuation of the release mechanism by the trigger member.

2. A hand rail assembly according to claim 1, wherein the at least one set of drive pins comprises a first set of drive pins and a second set of drive pins, the first set of drive pins engaging a first set of cutouts in the outer arm to latch the hand rail assembly in the storage position, the second set of drive pins engaging a second set of cutouts in the outer arm to latch the hand rail assembly in the operating position, the first and second sets of drive pins consecutively engageable.

3. A hand rail assembly according to claim 1, wherein the at least one recovery element is disposed in a corresponding opening formed within the rod, one end of the at least one recovery element affixed to the rod and an opposite end affixed to a corresponding at least one attachment point formed in the inner arm.

4. A hand rail assembly according to claim 1, wherein the aligned openings in the inner arms are slots for slideable movement of the drive pins extending therethrough.

5. A hand rail assembly according to claim 3, wherein the at least one attachment point comprises a tabbed portion formed by a 'C' shaped opening in the inner arm.

6. A hand rail assembly according to claim 1, wherein the recovery element comprises an elastic material.

7. A hand rail assembly according to claim 1, wherein the recovery element comprises a compressible material.

8. A hand rail assembly according to claim 7, wherein the recovery element comprises a spring.

9. A hand rail assembly according to claim 1, wherein the banister comprises a transparent structural material.

10. A hand rail assembly according to claim 9, further comprising a LED lighting system integral to the banister for illumination of the banister and an area proximate thereof when the hand rail assembly is in the operating position.

11. A hand rail assembly according to claim 9, wherein the transparent structural material of the banister is acrylic.

12. A hand rail assembly according to claim 1, wherein the outer arm comprises a trough in which the inner arm is nestable when the hand rail assembly is in the storage position, one end of the outer arm having a raised yoke for pivotally connecting said outer arm to the second mounting bracket.

* * * * *